United States Patent [19]

Marconi

[11] Patent Number: 5,443,045
[45] Date of Patent: Aug. 22, 1995

[54] TWO-STROKE FUEL-INJECTED INTERNAL COMBUSTION ENGINE

[75] Inventor: Pierluigi Marconi, Rimini, Italy

[73] Assignee: Bimota, S.P.A., Rimini, Italy

[21] Appl. No.: 167,985

[22] PCT Filed: Apr. 20, 1993

[86] PCT No.: PCT/IT93/00035

§ 371 Date: Dec. 23, 1993

§ 102(e) Date: Dec. 23, 1993

[87] PCT Pub. No.: WO93/22545

PCT Pub. Date: Nov. 11, 1993

[30] Foreign Application Priority Data

Apr. 24, 1992 [IT] Italy ............... BO92A0153

[51] Int. Cl.$^6$ .............................. F02B 3/00
[52] U.S. Cl. ................................... 123/299
[58] Field of Search ............ 123/299, 304, 294, 73 C, 123/73 E

[56] References Cited

U.S. PATENT DOCUMENTS

| | | | |
|---|---|---|---|
| 3,682,147 | 8/1972 | Irgens | 123/299 |
| 3,924,598 | 12/1975 | Davis | 123/299 |
| 4,140,095 | 2/1979 | Mowbray | 123/299 |
| 4,612,898 | 9/1986 | Steiger et al. | 123/299 |
| 4,924,828 | 5/1990 | Oppenheim | 123/299 |
| 5,140,959 | 8/1992 | Durbin | 123/304 |
| 5,271,362 | 12/1993 | Kobayashi et al. | 123/299 |

Primary Examiner—Raymond A. Nelli
Attorney, Agent, or Firm—Fay, Sharpe, Beall, Fagan, Minnich & McKee

[57] ABSTRACT

A two-stroke internal combustion engine of the type comprising a cylinder exhibiting an internal cavity of substantially cylindrical shape, a reciprocating piston accommodated slidably and coaxially within the cavity, a cylinder head connect to one end of the cylinder, of which the inwardly directed face affords a combustion chamber in communication with the cavity, and at least one spark plug supported by the cylinder head, of which the ignition electrodes project toward or occupy the combustion chamber, characterized in that it comprises at least one injector passing through a side wall of the cylinder, of which the fuel spray nozzle is disposed substantially facing a given area of the cavity, and an electronic control unit by which the injector is activated cyclically.

40 Claims, 2 Drawing Sheets

TWO-STROKE FUEL-INJECTED INTERNAL COMBUSTION ENGINE

ART FIELD

The present invention relates to a two-stroke internal combustion engine with direct low pressure electronic fuel injection.

Traditionally, two-stroke internal combustion engines afford highly advantageous characteristics in terms of their simplicity in construction and high power-to-weight ratio. By virtue of the latter feature, two-stroke motor cycle engines are well suited for mounting to lightweight and therefore easily handled frames.

Conversely, one has the very prominent drawback that engines of the type in question constitute a source of considerable pollution, and do not comply with the legal requirements encountered in many countries of the world. Moreover, the directives on environmental pollution destined gradually to be enacted in Europe during the course of the 1990s will be so stringent as effectively to outlaw the two-stroke internal combustion engines currently manufactured as motor cycle propulsion units.

The marked level of environmental pollution produced by conventional two-stroke engines having a carburettor type fuel system is due essentially to the fact that in the typical embodiment of the design, with induction taking place on the down stroke of the piston as fuel-air mixture is forced into the combustion chamber by way of the transfer ports, a not inconsiderable portion of the mixture escapes to the exhaust passage while the relative port is still open, without undergoing combustion.

BACKGROUND ART

One attempt aimed at overcoming this drawback, which envisages the utilization of mechanical fuel injection, is successful in reducing though not in wholly eliminating the escape of fuel-air mixture. The limited success of such a solution is explained principally by the fact that the injection time lapse is relatively long with a mechanical system, so that it will often be necessary to ensure that the injection of the fuel is completed well before the exhaust passage closes. Such a situation can be avoided in some measure though only in engines of small displacement, given that the amount of fuel injected is markedly small and the time required to effect the injection can be made relatively short, albeit using particularly sophisticated and costly injectors. With engines of large displacement, by contrast, or at least larger than the very smallest capacities, the quantities of fuel injected become considerably greater and the injection time lapses especially long.

A further drawback betrayed by conventional two-stroke internal combustion engines is reflected in their particular sensitivity to variations in temperature, pressure and humidity of the ambient air; in situations where these parameters may drift from the operating values under which the engine is rated, the effects are a marked loss of performance (power and torque) and a discernible rise in fuel consumption, resulting in an increased capacity of the engine to pollute the environment.

Accordingly, the object of the invention is to overcome the drawbacks mentioned above through the adoption of a two-stroke internal combustion engine such as can deliver highly respectable performance characteristics, while generating emissions broadly comparable to those from a four-stroke engine and remaining substantially free of the problems which occur in varying ambient conditions, as described above.

A further object of the invention is to provide a two-stroke internal combustion engine capable of achieving fuel consumption up to 60% lower than in a conventional engine of similar rated output.

DISCLOSURE OF THE INVENTION

The stated objects are realized, according to the invention, in a two-stroke internal combustion engine of the type comprising a cylinder exhibiting an internal cavity of substantially cylindrical shape, a reciprocating piston accommodated slidably and coaxially within the cavity, a cylinder head connected to one end of the cylinder, of which the inwardly directed face affords a combustion chamber in communication with the cavity, and at least one spark plug supported by the cylinder head, of which the ignition electrodes project toward or occupy the combustion chamber, characterized in that it comprises at least one injector passing through a side wall of the cylinder, of which the fuel spray nozzle is disposed substantially facing a given area of the cavity, and an electronic control unit by which the injector is activated cyclically.

To advantage, the cylinder of the two-stroke internal combustion engine disclosed is served by two injectors disposed with axes intersecting the axis of the cylinder and inclined at an angle of between 15° and 35° from a plane normal to the axis of the cylinder, the angle compassed by the axes of the two injectors being between 20° and 340°.

In a preferred embodiment of the invention, the nozzles of the two injectors are set apart from a plane disposed normal to the longitudinal axis of the cylinder, and coinciding with the face offered to the cylinder head, at a distance respectively no less and no greater than two values obtained by the multiplication of two constants 0.30 and 0.70 with the stroke of the piston.

The invention will now be described in detail, by way of example, with the aid of the accompanying drawings.

In the accompanying drawings, 1 denotes a two-stroke internal combustion engine, in its entirety, of which only the topmost portion is illustrated in the interests of brevity. Likewise in the interests of brevity, this same portion is described in the course of the specification, when referred to in its entirety, simply as "the engine".

Figure 1:
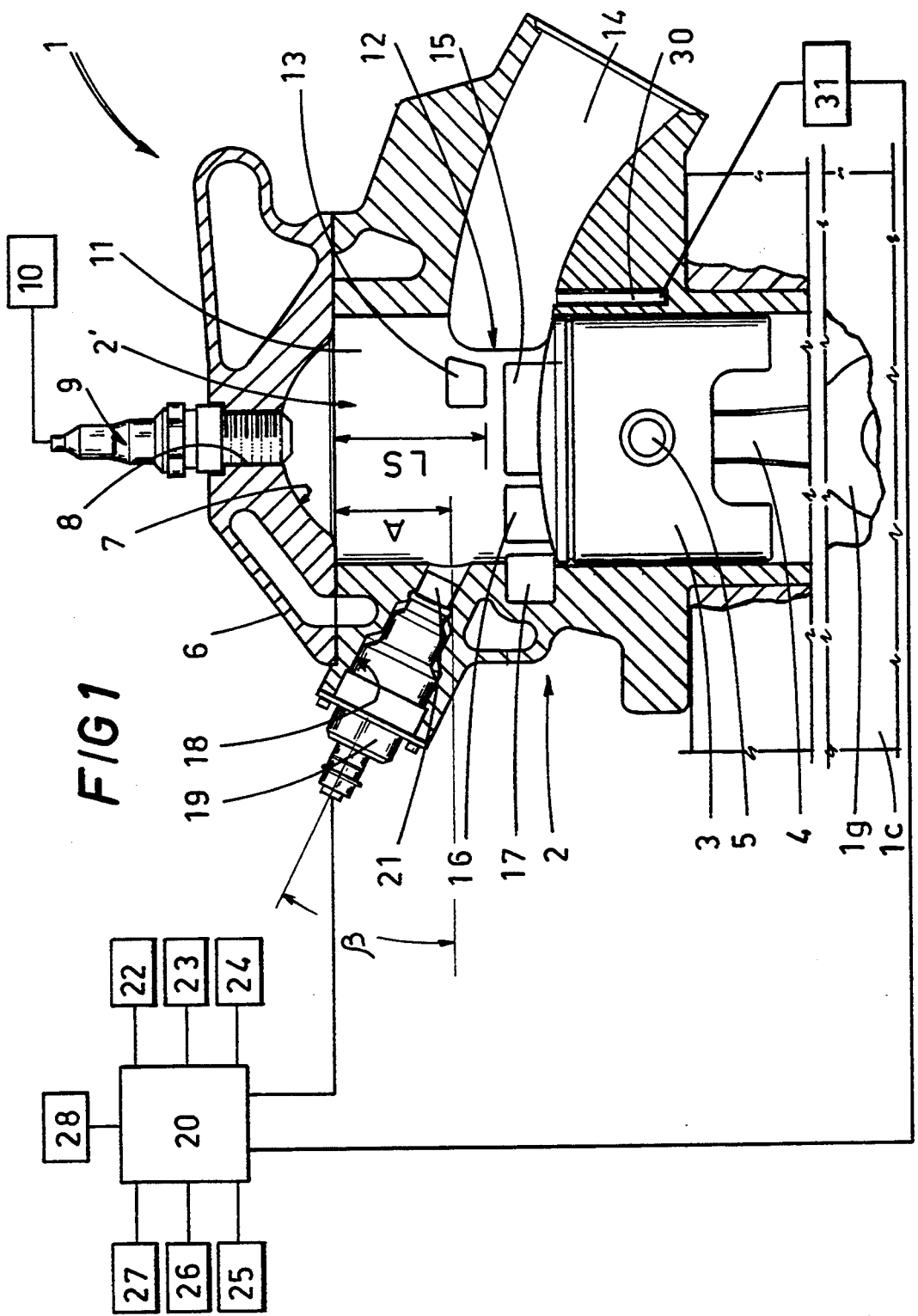
FIG. 1 provides a schematic representation of one part of the two-stroke internal combustion engine according to the invention, seen in section through I—I FIG. 2 and in conjunction with a block diagram.
Figure 2:
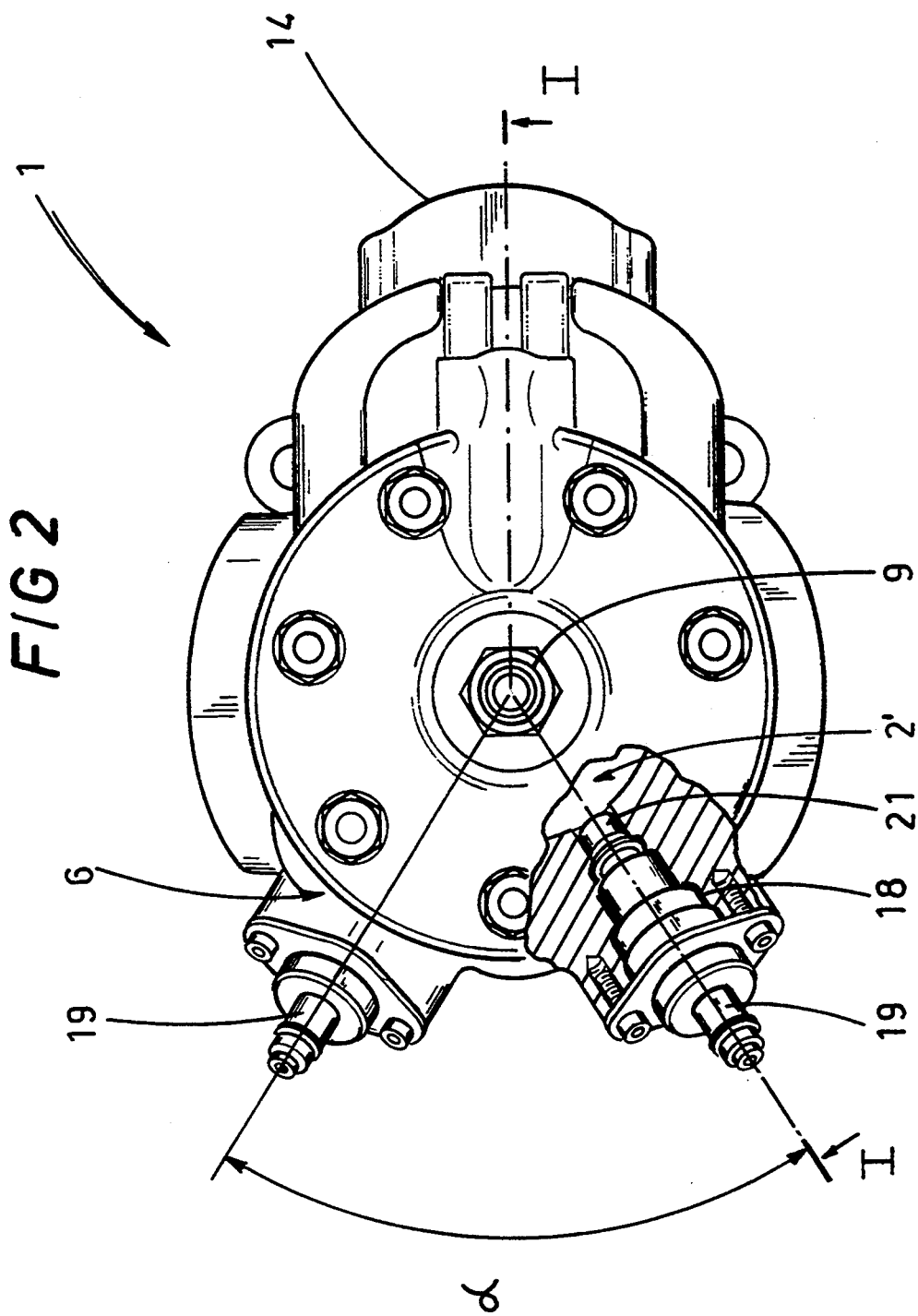
FIG. 2 shows the topmost portion of the two-stroke internal combustion engine of FIG. 1, seen in plan.

The engine 1 comprises a single cylinder 2, of which the axis is vertically disposed and of which the internal cavity 2' is occupied by an axially slidable piston 3 associated with the top end of a connecting rod 4 by way of a gudgeon pin 5 disposed horizontally and lying normal to the viewing plane of FIG. 1, in which the piston 3 is shown at bottom dead centre. 6 denotes a cylinder head united with a flat horizontal face afforded by the topmost end of the cylinder 2, and secured thus with threaded fastening means not illustrated, of which a portion of the face offered to the cavity of the cylinder 2 affords a substantially hemispherical combustion chamber 7. The head 6 affords a threaded hole 8, coaxial with the cylinder 2, accommodating a spark plug 9 connected to an electronic control unit of conventional type schematically denoted 10 by which iginition sparks are produced across the electrodes of the plug 9.

The side wall 11 of the cylinder 2 affords a main exhaust port 12, flanked on opposite sides by two additional exhaust ports 13 (of which one only is illustrated). These further ports 13, known as secondary exhaust ports, communicate indirectly with an exhaust pipe 14 by way of the main exhaust port 12, which is connected directly to the pipe. Also afforded by the side wall 11 of the cylinder 2 are two main inlet or transfer ports 15 disposed substantially in diametrical opposition (one only of which is shown), a pair of secondary inlet or transfer ports 16 (one only of which is shown) and a further inlet port 17, or "fifth port" positioned between the secondary transfer ports 16. The five inlet ports 15, 16 and 17 connect in a manner not illustrated, being entirely conventional, with the air intake chamber or casing 1c of the engine 1.

18 denotes one of two holes extending through two respective lateral portions of the cylinder 2, located symmetrically on either side of a diametral plane coinciding with a plane of symmetry of the exhaust port 12, of which the axes are positioned so as to intersect the axis of the cylinder 2 and disposed at an angle $\beta$ preferably of between 15° and 35° relative to a horizonal plane lying below the level at which the holes 18 emerge into the cavity. The angle $\alpha$ compassed by the axes of the holes 18 measures preferably between 20° and 340°.

Each hole 18 accommodates a coaxially disposed injector 19, secured rigidly and connected to an electronic control unit of conventional embodiment schematically denoted 20. The operation of the two injectors 19 is piloted by the control unit 20 in such a way that, for different running speeds (rpm) of the engine 1, activation will occur preferably after the crankshaft 1g has rotated through a given angle (allowing a tolerance of ±20° depending on the speed), measured from the position in which the piston 3 reaches top dead centre, as indicated in the following table of experimental values:

| INJECTION | | INJECTION | |
|---|---|---|---|
| TIMING (Y) | RPM (X) | TIMING (Y) | RPM (X) |
| 155° | 1000 | 82° | 8750 |
| 155° | 1500 | 74° | 9000 |
| 154° | 2000 | 69° | 9250 |
| 153° | 2500 | 66° | 9500 |
| 153° | 3000 | 61° | 9750 |
| 151° | 3500 | 59° | 10000 |
| 149° | 4000 | 56° | 10250 |
| 145° | 4500 | 52° | 10500 |
| 131° | 5000 | 52° | 10750 |
| 116° | 5500 | 50° | 11000 |
| 104° | 6000 | 50° | 11250 |
| 99° | 6500 | 50° | 11500 |
| 98° | 7000 | 45° | 11750 |
| 92° | 7500 | 45° | 12000 |
| 91° | 8000 | 45° | 12250 |
| 88° | 8500 | | |

The timing angles shown in the table indicate the instant at which a control signal is generated by the electronic control unit 20 to activate the injector 19, and are calculated to take account of the physiological/mechanical delay separating the moment of activation, in which the control signal is transmitted to the injector 19, from the actual moment of response in which fuel is directed into the cylinder by the nozzle 21.

In a preferred solution, the nozzles 21 of the injectors 19 are set apart from a horizontal plane coinciding with the topmost face of the cylinder 2 by a distance, denoted A, of which the proportion is dictated by the upper and lower limit values of the following mathematical equation:

$$0.30^a \text{ STROKE} \leq A \leq 0.70^a \text{ STROKE}$$

where STROKE represents the distance travelled by the piston 3 internally of the cavity 2' afforded by the cylinder 2. The positions of the nozzles must be such, in any event, that fuel is directed into the cylinder above the level of the exhaust port (distance LS).

Referring to the block diagram part of FIG. 1, 22 denotes a sensing device of conventional type, capable of monitoring the angular position of the throttle valve (not illustrated) internally of the air inlet duct (not illustrated), in relation to a fixed reference, and supplying a signal indicative of the position to the electronic control unit 20; in short, the sensing device 22 serves to identify the size of the opening afforded by a passage of variable width forming part of the air inlet duct. 23 denotes a second sensing device of conventional type, capable of monitoring the speed of rotation of the crankshaft 1g and supplying a corresponding signal to the electronic contol unit 20. Similarly, 24 denotes a sensing device positioned internally of the air intake housing (not illustrated) of the engine 1, which is capable of supplying a signal to the electronic control unit 20 indicative of the air pressure in the enclosure. A further device 25 senses the temperature of the engine coolant and returns a corresponding signal to the electronic control unit 20. The blocks denoted 26 and 27 are devices serving respectively to sense the ambient air temperature and to verify the voltage across the terminals of the battery (not shown) associated with the engine 1, and finally, 28 denotes a sensor of which the purpose is to sample the exhaust gases and return a signal to the electronic control unit 20 reflecting the percentage of substances in the emissions escaping combustion.

30 denotes a proportioning element, represented schematically as a sliding gate located along the path followed by gases discharged from the engine 1 via the exhaust ports 12 and 13; such an element 30 is capable of vertical movement, through the agency of an actuator consisting in a stepping motor 31 piloted by the electronic control unit 20, to the end of altering the width of the ports 12 and 13.

As to the operation of the engine 1, this will be immediately apparent to a person skilled in the art from the content of the foregoing description, and few comments are required. The salient feature, at all events, is that during each revolution of the engine 1 the injectors 19 will direct a metered amount of fuel into the combustion chamber 7, of which the timing is discernible from the table of values reproduced above and the quantity determined by the electronic control unit 20, on the basis of parameters stored in an internal software facility and of the information in the signals received from the various sensing devices 22, 23, 24, 25, 26, 27 and 28. Also significant is the fact that the width of the passage afforded by the exhaust ports 12 and 13 can be altered utilizing a command from the same internal software of the electronic control unit 20 to activate the stepping motor 31.

Lastly, experiment has shown that two features, namely the geometry of the combustion chamber 7 and the direct correlation between the positioning of the injectors 19 and the timing of the injection, combine to ensure that any fuel dispensed by the injectors 19 before the exhaust ports 12 and 13 are completely closed will fall directly on the crown of the piston 3, vaporizing immediately due to the intense heat and ascending toward the spark plug 9; accordingly, there is no escape of unburned fuel by way of the exhaust ports 12 and 13.

This is the classic case of an engine operating at low crankshaft speeds, for example in situations where propulsion is typified by repeated bursts of acceleration at no great power, as in urban areas, when the charge of fuel supplied to the combustion chamber is relatively small and therefore vaporizes readily and "instantaneously" on the piston crown. The velocity of the piston is not especially high in this instance, and the time lapse compassing injection, which is dictated by the amount of fuel delivered (and by the positioning of the injector itself —viz, distance A and angle $\beta$) will be such as to allow the piston to close the exhaust ports; in other words, the various factors mentioned above are exploited to the end of ensuring that injection will occur with the exhaust ports "almost closed", thereby minimizing (if not altogether eliminating) the amount of unignited fuel entrained through the exhaust ports with the spent gases, and reducing pollution from the engine practically to nothing. This is indeed precisely the result one wishes to achieve at low engine speeds. The situation changes as the crankshaft speed increases, though any such change is likely to reflect operating conditions of a quite different character and certainly not those typical of a residential area or town centre.

It will be clear from the specification that the objects stated at the outset are fully realized in a two-stroke engine 1 according to the present invention, witness the notably superior levels of performance obtained, the fact that its impact on the atmosphere compares favourably with that of a four-stroke engine, and the substantial elimination of those problems connected with varying ambient conditions as mentioned in reference to the prior art.

In view of the fact that there are no emissions of unburned fuel into the atmosphere, moreover, the engine 1 according to the invention has been shown capable of achieving fuel economies of up to 60%.

I claim:

1. In a two-stroke internal combustion engine, of the type comprising a cylinder exhibiting an internal cavity of substantially cylindrical shape, a reciprocating piston accommodated slidably and coaxially within the cavity, a cylinder head connected to a first end of the cylinder, the cylinder head having an inwardly directed face defining a combustion chamber in communication with the cavity, and at least one spark plug supported by the cylinder head, the at least one spark plug having an ignition electrode exposed to the combustion chamber, a fuel injection apparatus comprising:
   at least one injector passing through a wall of the cylinder;
   a fuel spray nozzle disposed on said at least one injector substantially facing a first area of the cavity; and,
   a first electronic control unit for cyclically activating the at least one injector; and,
   a first pair of injectors having axes positioned to intersect the axis of the cylinder at an angle $\beta$ of between 15° and 35° in relation to a plane normal to the axis of the cylinder and compassing an angle $\alpha$ of between 20° and 340°.

2. A fuel injection apparatus according to claim 1, wherein the fuel spray nozzles of the first pair of injectors are set apart from a plane, disposed normal to the longitudinal axis of the cylinder and coinciding with said inwardly directed face of the cylinder offered to the cylinder head at a distance A respectively no less and no greater than the products obtained from the multiplication of constants 0.30 and 0.70 by the stroke of the reciprocating piston respectively.

3. A fuel injection apparatus according to claim 2, wherein the nozzles of the first pair of injectors are set apart from a first plane normal to the longitudinal axis of the cylinder at a distance A less than a minimum distance separating an exhaust port of the cylinder from the first plane.

4. In a two-stroke internal combustion engine, of the type comprising a cylinder exhibiting an internal cavity of substantially cylindrical shape, the cylinder having at least a first lateral area defining an inlet port for admitting air into the cylinder and at least a second lateral area defining an exhaust port for allowing the release of combustion gases from the cylinder, a reciprocating piston accommodated slidably and coaxially within the internal cavity, a cylinder head connected to a first end of the cylinder, the cylinder head having an inwardly directed face defining a combustion chamber in communication with the cavity, and at least one spark plug on the cylinder head, the at least one spark plug having a ignition electrode projecting toward the combustion chamber, a fuel delivery system comprising:
   at least one fuel injector passing through a wall of the cylinder;
   a fuel spray nozzle disposed on said at least one fuel injector substantially facing a first area of the cavity; and,
   a first electronic control unit for cyclically activating said at least one fuel injector, the first electronic control unit including means for activating the at least one fuel injector in such a way that with each revolution of the engine the injection of fuel commences at a moment in which the exhaust port is substantially partly open and terminates with the exhaust port substantially fully closed.

5. A fuel delivery system according to claim 4, comprising at least two injectors having axes position to intersect the axis of the cylinder at an angle (8) within the range of between 15° and 35° in relation to a plane normal to the longitudinal axis of the cylinder and compassing an angle $\alpha$ within the range of between 20° and 340°, and of which the respective at least two nozzles are set apart from a plane normal to the axis of the cylinder and coinciding with said inwardly directed face of the cylinder at a distance A respectively no less and no greater than the products obtained from multiplying 0.30 and 0.70 by the stroke of the reciprocating piston respectively.

6. A fuel delivery system according to claim 5, further comprising a first sensor device for i) measuring the size of an opening defined by a passage of variable width admitting air to the engine, and ii) providing the first electronic control unit with a first signal indicative of the measured size.

7. A fuel delivery system according to claim 6, further comprising a second sensor device for i) measuring the speed of rotation of the engine and ii) providing the first electronic control unit with a second signal indicative of the measured speed.

8. A fuel delivery system according to claim 7, further comprising a third sensor device for i) measuring the pressure of air internally of an intake housing associated with the engine and ii) providing the first electronic control unit with a third signal indicative of the measured pressure.

9. A fuel delivery system according to claim 8 further comprising a fourth sensor device for i) measuring the temperature of a liquid by which the engine is cooled, and ii) providing the first electronic control unit with a fourth signal indicative of the measured temperature.

10. A fuel delivery system according to claim 9, further comprising a fifth sensor device for i) measuring the temperature of the ambient air, and ii) providing the first electronic control unit with a fifth signal indicative of the measured temperature.

11. A fuel delivery system according to claim 10, further comprising a sixth sensor device for i) measuring the voltage across terminals of a battery associated with the engine, and ii) providing the first electronic control unit with a sixth signal indicative of the measured voltage.

12. A fuel delivery system according to claim 11, further comprising a seventh sensor device for i) sampling exhaust gases emitted from the engine, and ii) providing the first electronic control unit with a seventh signal indicative of a percentage of substances in the emissions escaping combustion.

13. A fuel delivery system according to claim 12, further comprising a second electronic control unit for determining the timing of an ignition spark struck between the electrodes of the spark plug.

14. A fuel delivery system according to claim 11 further comprising:
   proportioning means for varying the size of the passage afforded by at least one exhaust port; and,
   means for activating the proportioning means, the activation being interlocked with the first electronic control unit.

15. A fuel delivery system according to claim 4, wherein the first electronic control unit includes means for activating the at least one injector in such a manner that for a given running speed rpm of the engine, injection occurs after crankshaft of the engine has rotated through an angle, measured from the position in which the piston reaches top dead centre of: 155° at 1000 rpm, 155° at 1500 rpm, 154° at 2000 rpm, 153° at 2500 rpm, 153° at 3000 rpm, 151° at 3500 rpm, 149° at 4000 rpm, 145° at 4500 rpm, 131° at 5000 rpm, 116° at 5500 rpm, 104° at 6000 rpm, 99° at 6500 rpm, 98° at 7000 rpm, 92° at 7500 rpm, 91° at 8000 rpm, 88° at 8500 rpm, 82° at 8750 rpm, 74° at 9000 rpm, 69° at 9250 rpm, 66° at 9500 rpm, 61° at 9750 rpm, 59° at 10000 rpm, 56° at 10250 rpm, 52° at 10500 rpm, 52° at 10750 rpm, 50° at 11000 rpm, 50° at 11250 rpm, 50° at 11500 rpm, 45° at 11750 rpm, 45° at 12000 rpm, and 45° at 12250 rpm, allowing a tolerance of ±20°.

16. A fuel delivery system according to claim 5, further comprising:
   a first sensor device for i) measuring the size of an opening defined by a passage of variable width admitting air to the engine, and ii) providing the first electronic control unit with a first signal indicative of the measured size
   a second sensor device for i) measuring the speed of rotation of the engine and ii) providing the first electronic control unit with a second signal indicative of the measured speed
   a third sensor device for i) measuring the pressure of air internally of an intake housing associated with the engine and ii) providing the first electronic control unit with a third signal indicative of the measured pressure
   a fourth sensor device for i) measuring the temperature of a liquid by which the engine is cooled, and ii) providing the first electronic control unit with a fourth signal indicative of the measured temperature
   a fifth sensor device for i) measuring the temperature of the ambient air, and ii) providing the first electronic control unit with a fifth signal indicative of the measured temperature; and,
   a sixth sensor device for i) measuring the voltage across terminals of a battery associated with the engine, and ii) providing the first electronic control unit with a sixth signal indicative of the measured voltage.

17. A fuel delivery system according to claim 16 further comprising:
   proportioning means for varying the size of the passage afforded by at least one exhaust port; and,
   means for activating the proportioning means, the activation being interlocked with the first electronic control unit.

18. A fuel delivery system according to claim 5, further comprising a second electronic control unit for determining the timing of an ignition spark struck between the electrodes of the spark plug.

19. A method of fuel injection for use in a two-stroke internal combustion engine of the type including a cylinder exhibiting an internal cavity of substantially cylindrical shape, a reciprocating piston accommodated slidably and coaxially within the cavity, a cylinder head connected to a first end of the cylinder, the cylinder head having an inwardly directed face defining a combustion chamber in communication with the cavity, and at least one spark plug supported by the cylinder head, the at least one spark plug having an ignition exposed to the combustion chamber, the fuel injection method comprising:
   providing at least one injector passing through a wall of the cylinder;
   disposing a fuel spray nozzle on said at least one injector substantially facing a first area of the cavity; and,
   cyclically activating the at least one injector injector with a first electronic control unit in such a manner that for a given running speed rpm of the engine, injection occurs after a crankshaft of the engine has rotated through an angle, measured from the position in which the piston reaches top dead centre of: 155° at 1000 rpm, 155° at 1500 rpm, 154° at 2000 rpm, 153° at 2500 rpm, 153° at 3000 rpm, 151° at 3500 rpm, 149° at 4000 rpm, 145° at 4500 rpm, 131° at 5000 rpm, 116° at 5500 rpm, 104° at 6000 rpm, 99° at 6500 rpm, 98° at 7000 rpm, 92° at 7500 rpm, 91° at 8000 rpm, 88° at 8500 rpm, 82° at 8750 rpm, 74° at 9000 rpm, 69° at 9250 rpm, 66° at 9500 rpm, 61° at 9750 rpm, 59° at 10000 rpm, 56° at 10250 rpm, 52° at 10500 rpm, 52° at 10750 rpm, 50° at 11000 rpm, 50° at 11250 rpm, 50° at 11500 rpm, 45° at 11750 rpm, 45° at 12000 rpm, and 45° at 12250 rpm.

20. A fuel injection apparatus for use with a two-stroke internal combustion engine of the type including a cylinder exhibiting an internal cavity of substantially cylindrical shape, a reciprocating piston accommodated slideably and coaxially within the cavity, a cylinder head connected to a first end of the cylinder, the cylinder head having an inwardly directed face defining a combustion chamber in communication with the cavity, the apparatus comprising:
- a pair of fuel injectors passing through a wall of the cylinder and having axes positioned to intersect the axis of the cylinder at an angle $\beta$ of between 15° and 35° in relation to a plane normal to the axis of the cylinder and encompassing an angle $\alpha$ of between 20° and 340°; and,
- a first control unit for cyclically activating said pair of fuel injectors.

21. The fuel injection apparatus according to claim 20 further comprising a pair of fuel spray nozzles disposed on said pair of fuel injectors and set apart from a plane disposed normal to the longitudinal axis of the cylinder and coinciding with said inwardly directed face of the cylinder offered to the cylinder head at a distance A respectively no less and no greater than the products obtained from the multiplication of constance 0.30 and 0.70 by a stroke of the reciprocating piston respectively.

22. The fuel injection apparatus according to claim 21 wherein said pair of fuel spray nozzles are set apart from a first plane normal to the longitudinal axis of the cylinder at a distance A less than a minimum distance separating an exhaust port of the cylinder from the first plane.

23. A fuel injection apparatus for use with a two-stroke internal combustion engine of the type including a cylinder exhibiting an internal cavity of substantially cylindrical shape, a reciprocating piston accommodated slideably and coaxially within the cavity, a cylinder head connected to a first end of the cylinder, the cylinder head having an inwardly directed face defining a combustion chamber in communication with the cavity, the apparatus comprising:
- at least one fuel injector passing through a wall of the cylinder;
- a control unit for cyclically activating said at least one fuel injector; and,
- a fuel spray nozzle disposed on said at least one fuel injector substantially facing a first area of the cavity and set apart from a plane disposed normal to the longitudinal axis of the cylinder and coinciding with said inwardly directed face of the cylinder offered to the cylinder head at a distance A respectively no less and no greater than the products obtained from the multiplication of constants 0.30 and 0.70 by the stroke of the reciprocating piston respectively.

24. The fuel injection apparatus according to claim 23 comprising a pair of fuel injectors having axes positioned to intersect the axis of the cylinder at an angle $\beta$ of between 15° and 35° in relation to a plane normal to the axis of the cylinder and compassing an angle $\alpha$ of between 20° and 340°.

25. The fuel injection apparatus according to claim 23 wherein said fuel spray nozzle is set apart from a first plane normal to the longitudinal axis of the cylinder at a distance A less than a minimum distance separating an exhaust port of the cylinder from the first plane.

26. A fuel delivery system for use in a two-stroke internal combustion engine, of the type including a cylinder having an internal cavity of substantially cylindrical shape, the cylinder having at least a first lateral area defining an inlet port adapted to admit air into the cylinder and at least a second lateral area defining an exhaust port adapted to release gases from the cylinder, a piston accommodated slidably and coaxially within the internal cavity, a cylinder head connected to a first end of the cylinder, the cylinder head having an inwardly directed face defining a combustion chamber in communication with the cavity, and at least one spark plug on the cylinder head, the at least one spark plug having an ignition electrode projecting toward the combustion chamber, the fuel delivery system comprising:
- at least one fuel injector passing through a wall of the cylinder;
- a fuel spray nozzle disposed on said at least one fuel injector substantially facing a first area of the cavity; and,
- a control unit for cyclically activating said at least one fuel injector at a moment in which the exhaust port is substantially partly open and deactivating said at least one fuel injector at a moment in which the exhaust port substantially fully closed.

27. A fuel delivery system according to claim 26, comprising at least two injectors having axes position to intersect the axis of the cylinder at an angle $\beta$ within the range of between 15° and 35° in relation to a plane normal to the longitudinal axis of the cylinder and compassing an angle $\alpha$ within the range of between 20° and 340°, and of which the respective at least two nozzles are set apart from a plane normal to the axis of the cylinder and coinciding with said inwardly directed face of the cylinder at a distance A respectively no less and no greater than the products obtained from multiplying 0.30 and 0.70 by the stroke of the reciprocating piston respectively.

28. A fuel delivery system according to claim 26, further comprising a sensor device for i) measuring the size of an opening defined by a passage of variable width admitting air to the engine, and ii) providing the control unit with a signal indicative of the measured size.

29. A fuel delivery system according to claim 26, further comprising a sensor device for i) measuring the speed of rotation of the engine and ii) providing the first control unit with a signal indicative of the measured speed.

30. A fuel delivery system according to claim 26, further comprising a sensor device for i) measuring the pressure of air internally of an intake housing associated with the engine and ii) providing the control unit with a signal indicative of the measured pressure.

31. A fuel delivery system according to claim 26, further comprising a sensor device for i) measuring the temperature of a liquid by which the engine is cooled, and ii) providing the control unit with a signal indicative of the measured temperature.

32. A fuel delivery system according to claim 26, further comprising a sensor device for i) measuring the temperature of the ambient air, and ii) providing the control unit with a signal indicative of the measured temperature.

33. A fuel delivery system according to claim 26, further comprising a sensor device for i) measuring the voltage across terminals of a battery associated with the engine, and ii) providing the control unit with a signal indicative of the measured voltage.

34. A fuel delivery system according to claim 26, further comprising a sensor device for i) sampling exhaust gases emitted from the engine, and ii) providing the control unit with a signal indicative of a percentage of substances in the emissions escaping combustion.

35. A fuel delivery system according to claim 26, further comprising a second control unit for determining the timing of an ignition spark struck between the electrodes of the spark plug.

36. A fuel delivery system according to claim 26 further comprising:
proportioning means for varying the size of the passage afforded by at least one exhaust port; and,
means for activating the proportioning means, the activation being interlocked with the control unit.

37. A fuel delivery system according to claim 26, wherein the control unit includes means for activating the at least one injector in such a manner that for a given running speed rpm of the engine, injection occurs after a crankshaft of the engine has rotated through an angle, measured from the position in which the piston reaches top dead centre of: 155° at 1000 rpm, 155° at 1500 rpm, 154° at 2000 rpm, 153° at 2500 rpm, 153° at 3000 rpm, 151° at 3500 rpm, 149° at 4000 rpm, 145° at 4500 rpm, 131° at 5000 rpm, 116° at 5500 rpm, 104° at 6000 rpm, 99° at 6500 rpm, 98° at 7000 rpm, 92° at 7500 rpm, 91° at 8000 rpm, 88° at 8500 rpm, 82° at 8750 rpm, 74° at 9000 rpm, 69° at 9250 rpm, 66° at 9500 rpm, 61° at 9750 rpm, 59° at 10000 rpm, 56° at 10250 rpm, 52° at 10500 rpm, 52° at 10750 rpm, 50° at 11000 rpm, 50° at 11250 rpm, 50° at 11500 rpm, 45° at 11750 rpm, 45° at 12000 rpm, and 45° at 12250 rpm, allowing a tolerance of ±20°.

38. A fuel delivery system according to claim 26, further comprising:
a first sensor device for i) measuring the size of an opening defined by a passage of variable width admitting air to the engine, and ii) providing the control unit with a first signal indicative of the measured size
a second sensor device for i) measuring the speed of rotation of the engine and ii) providing the control unit with a second signal indicative of the measured speed
a third sensor device for i) measuring the pressure of air internally of an intake housing associated with the engine and ii) providing the control unit with a third signal indicative of the measured pressure
a fourth sensor device for i) measuring the temperature of a liquid by which the engine is cooled, and ii) providing the control unit with a fourth signal indicative of the measured temperature
a fifth sensor device for i) measuring the temperature of the ambient air, and ii) providing the control unit with a fifth signal indicative of the measured temperature; and,
a sixth sensor device for i) measuring the voltage across terminals of a battery associated with the engine, and ii) providing the control unit with a sixth signal indicative of the measured voltage.

39. A fuel delivery system according to claim 26 further comprising:
proportioning means for varying the size of the passage afforded by at least one exhaust port; and,
means for activating the proportioning means, the activation being interlocked with the control unit.

40. A fuel delivery system according to claim 26, further comprising a second control unit for determining the timing of an ignition spark struck between the electrodes of the spark plug.

* * * * *